United States Patent [19]

Gleason, III et al.

[11] Patent Number: 4,931,975

[45] Date of Patent: Jun. 5, 1990

[54] MICROPROCESSOR-BASED CONTROLLER WITH SYNCHRONOUS RESET

[75] Inventors: Henry A. Gleason, III, Johnson Creek; Jerel S. Jamieson, Watertown, both of Wis.

[73] Assignee: Johnson Service Company, Milwaukee, Wis.

[21] Appl. No.: 135,418

[22] Filed: Dec. 21, 1987

[51] Int. Cl.[5] .............................................. G06F 15/20
[52] U.S. Cl. .................................. 364/570; 364/496; 364/707; 431/26
[58] Field of Search ............... 364/140, 143, 148, 570, 364/200, 900, 431.04, 496, 707; 431/25, 26, 46, 51; 371/12, 66

[56] References Cited

U.S. PATENT DOCUMENTS

| | | | |
|---|---|---|---|
| 4,282,574 | 8/1981 | Yoshida et al. | 364/431 |
| 4,365,290 | 12/1982 | Nelms et al. | 364/707 |
| 4,381,552 | 4/1983 | Nocilini et al. | 364/707 |
| 4,455,623 | 6/1984 | Wesemeyer et al. | 364/707 |
| 4,551,841 | 11/1985 | Fujita et al. | 371/66 |
| 4,562,544 | 12/1985 | Bonitz et al. | 364/431.11 |
| 4,581,697 | 4/1986 | Jamieson et al. | 364/140 |
| 4,612,418 | 9/1986 | Takeda et al. | 364/707 |
| 4,614,880 | 9/1986 | Go et al. | 364/707 |
| 4,683,568 | 7/1987 | Urban | 371/66 |
| 4,696,002 | 9/1987 | Schleupen et al. | 371/66 |
| 4,740,891 | 4/1988 | Kirkpatrick | 364/143 |
| 4,759,592 | 7/1988 | Dahnert | 371/12 |

Primary Examiner—Kevin J. Teska
Attorney, Agent, or Firm—Edward L. Levine; Alexander M. Gerasimow

[57] ABSTRACT

A microprocessor-based controller with synchronous reset operates in synchrony with a recurring signal coupled to its reset terminal and executes a predetermined linear program during each acive portion of the recurring signal. The controller remains in an inactive state until the recurring signal again triggers a successive active state. The controller is applicable to control applications requiring high reliability, while retaining the flexibility afforded by a microprocessor-based system. The preferred embodiments of the microprocessor-based controller are applied to combustible fuel burners employing various operating strategies.

16 Claims, 3 Drawing Sheets

MICROPROCESSOR-BASED CONTROLLER WITH SYNCHRONOUS RESET

BACKGROUND OF THE INVENTION

This invention relates generally to a controller of the type suitable for activating a switch device of an electronic type such as may be used in a combustible fuel burner. More specifically, this invention relates to a microprocessor-based controller apparatus for executing a linear program in synchrony with a recurring signal coupled to the reset terminal of the microprocessor. The preferred embodiments of the invention employing the microprocessor-based controller will be described with reference to combustible fuel burner systems, however the invention is not so limited. The invention is in fact applicable in any application where a high reliability microprocessor-based control circuit is desired.

A variety of gas ignition controls are known and generally include apparatus constructed of discrete components for effecting a single, predetermined control sequence tailored to a specific application. Such gas ignition systems typically include a relay which is energized in response to a thermostatic demand for heat and for actuating a pilot gas valve, a spark generating circuit for igniting the pilot gas either coincidently with the energization of the pilot valve or within a predetermined time thereafter, a flame-sensing probe for detecting the presence of a pilot flame and an output relay section for energizing a main fuel valve upon a detection of the pilot flame. Refinements of this fundamental system may include a pair of electromagnetic relays which are required to be operated in a particular sequence upon each reception of a thermostatic demand for heat. The sequential operation of these relays is effective in verifying the integrity of certain circuit components. Examples of such gas ignition systems are shown and described in U.S. Pat. Nos. 4,077,762 and 4,178,149. While these gas ignition systems have heretofore been satisfactory, they have failed to appreciate the manner in which a microprocessor may be utilized therein to continually monitor and verify the integrity of certain circuit components and to provide a degree of application flexibility heretofore unknown.

In particular, these earlier devices have failed to appreciate how a microprocessor-based control apparatus may be programmably configured with any one of a variety of control strategies whereby the apparatus may be readily adapted to a variety of gas-fueled furnaces, each presenting a different control requirement.

An example of a microprocessor-based controller is disclosed in U.S. Pat. No. 4,581,697, assigned to the assignee of the present invention. This microprocessor-based apparatus is an attempt to control the operation of a combustion fuel burner and to make use of a synchronizing signal for monitoring the integrity of certain circuit components, which may incorporate one or more input and output stages and which is adaptable to conduct its control sequences in accordance with predetermined lapses of time rather than upon the occurrence of predetermined events. However, in a combustion fuel burner and in other applications requiring a high degree of reliability it is necessary to be able to predict and/or limit the possible failure modes of the system. While in conventional systems described above this can be accomplished, heretofore this has not been the case with microprocessor-based systems. Conventional microprocessor-based control systems, driven by software, can theoretically have an infinite number of unpredictable failure modes. Accordingly, a microprocessor-based control system offering a high degree of reliability and readily adaptable to a wide variety of control strategies would be a distinct advance in the art.

SUMMARY OF THE INVENTION

It is an object of the present invention to provide a microprocessor-based burner control apparatus which exhibits a high degree of reliability and which may be readily adapted to a wide variety of control strategies.

Another object of the present invention is to provide a microprocessor-based controller which utilizes a recurring reset signal for monitoring system integrity and for controlling the rate at which the microprocessor program is executed.

A further object of the invention is to provide a microprocessor-based controller which executes a linear program thereby to achieve greater reliability.

The invention relates to an apparatus for reliably controlling a process and includes a microprocessor having input circuitry for receiving an electrical signal conveying information about the process and output circuitry for providing electrical output signals to control at least one parameter related to the process. Means are also provided for applying activating signals to the reset terminal of the microprocessor. The activating signals have succeeding repetitive first and second levels, such that in operation the microprocessor enters an active state when the activating signal is at a first level and an inactive state when the activating signal is at a second level. While in the active state, the microprocessor executes a linear program and provides output signals to reliably control the process. In the preferred embodiment, the process controlled is the operation of a combustible fuel furnace, which it can operate in the direct, indirect, and hot surface ignition modes. The activating signal conveniently comprises the alternating current signal used to energize the microprocessor. To insure operational reliability, the microprocessor includes means for performing a plurality of data integrity checks upon entering the active state and further includes means for calculating and storing information prior to entering the inactive state. The stored information is useful to perform data integrity checks upon entering subsequent active states. During operation the microprocessor verifies various operational states of the linear program based on input electrical signals with predetermined states stored in a memory of the microprocessor and aborts execution of the program if a disparity is identified.

DETAILED DESCRIPTION OF THE INVENTION

Initially it will be beneficial to consider that in general, there are a number of known control strategies for operating and igniting a combustible fuel burner system. Examples of such methods, employing gas as a fuel, include direct, indirect and hot-surface ignition systems. Briefly, in the indirect method, the gas ignition sequence includes the step of igniting a pilot flame, prior to making gas available to the burner from a mains supply which is then ignited by the pilot flame. In the direct method, the gas from the mains is ignited without the intermediary of a pilot flame. Finally, in the hot-surface method, an igniter element, typically constructed of carbide, is heated electrically to a temperature suitable for igniting the mains gas supply to the burner directly. The indirect method of ignition will be described with reference to FIG. 1.

Figure 1:
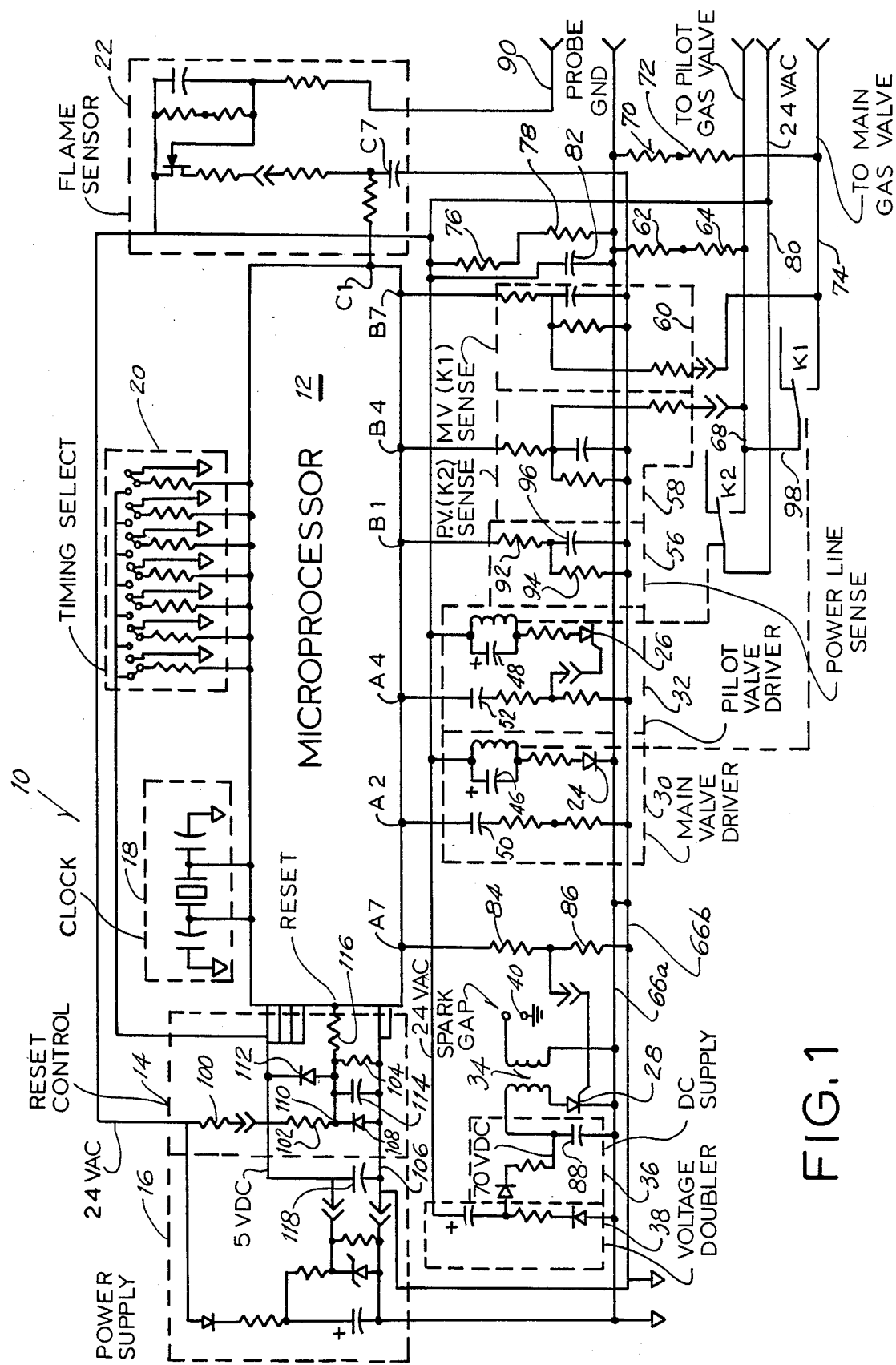
FIG. 1 is a detailed electrical schematic of the microprocessor-based controller in accordance with the present invention.

Referring now to FIG. 1, there is shown in circuit schematic form an inventive controller system generally designated 10, having a microprocessor 12 connected at its RESET terminal, through a reset control circuit 14 to a power supply circuit 16 energized in the preferred embodiment by a source of 24 volts AC. As will be more fully described hereinafter, reset control circuit 14 causes the microprocessor to alternate between an active state and a rest state during each cycle of the 60 Hz. input frequency of the 24 volt AC supply. During the active cycle, the microprocessor executes a predetermined program prior to resuming the rest state. The microprocessor is also operatively connected to a clock generator 16 and a timing select circuit 20, a flame sensor circuit 22, all of conventional design. The flame sensor circuit, connected to the microprocessor at its C1 terminal, is substantially identical in operation and configuration to that disclosed in the afore-identified U.S. Pat. No. 4,581,697, which is incorporated herein by reference.

Terminals A2, A4 and A7 of the microprocessor are designated, in the preferred embodiment, as outputs and are connected to activate, respectively, thyristor devices 24, 26 and 28 of a main valve driver circuit 30, a pilot valve driver circuit 32, and the primary of a spark transformer 34, respectively. Spark transformer 34 is connected at its primary to a DC supply 36, which is powered from a voltage doubler circuit 38 energized from a 24 volt AC source. The secondary of the transformer is adapted to create a spark gap 40 to the system ground and when properly energized provides the spark used to ignite the pilot flame in the indirect ignition method and the main burner flame in the direct ignition method. Each of main valve drive 30 and pilot valve driver circuit 32 include electromagnetic relays 42 and 44, respectively, which are energized when thyristor devices 24 and 26, respectively, are activated to a conductive state. Relay 42 controls a set of relay contacts designated K1 used to operate a main gas valve (not shown). Relay 44, similarly controls relay contacts designated K2, used to operate a pilot valve (not shown). Each of relays 42 and 44 includes capacitors 46 and 48, respectively, connected across the relay coil and used to momentarily energize the relays when power is not available because the microprocessor is in the "rest" state, as will be more fully described hereinafter. Capacitors 50 and 52 connected in series with the gate electrodes of thyristor devices 24 and 26, respectively, act as noise/interference filters in the circuit and prevent spurious activation of the thyristors into a conductive state.

Microprocessor terminals B1, B4 and B7 are, in the preferred embodiment, configured as inputs for sensing the status of, respectively, power line 54, pilot gas valve relay K2 and main gas valve relay K1. The check of the power line is accomplished through power line sense circuit 56, while the status of the K2 and K1 relay contacts is checked, respectively, by means of pilot valve sense circuit 58 and main valve sense circuit 60.

There are additionally provided series connected resistors 62 and 64 between a ground bus 66a and pilot gas valve output line 68 of relay contacts K2. Resistors 62 and 64 act as load resistors for the pilot valve. Similar series-connected resistors 70 and 72 between ground bus 66a and main gas valve relay output line 74, act as load resistors for the main gas valve. The function of these load resistors is to maintain the electrical valve outputs at near ground potential, unless 24 volt AC power is applied thereto, to prevent unintentional spurious activation. An additional pair of series-connected load resistors 76 and 78 between ground bus 66a and the 24 volt AC line, designated by reference numeral 80, act as load resistors for a thermostat (not shown) to which the control system 10 responds when the thermostat contacts are closed. The resistors 76 and 78 provide a load which permits the thermostat to have rechargeable batteries (as some types do) on board without affecting ignition system operation. Capacitor 82 connected in parallel with resistors 76 and 80 provides noise filtering.

General operation of controller 10 in the indirect ignition method will be described first. A more detailed description of the inventive method for operating the microprocessor controller will be provided hereinafter.

In operation, when thermostat contacts (not shown) close indicating a need for heat, for example, power is applied to power supply circuit 16 from a source of 24 volt AC and through reset control circuit 14 to the RESET terminal of microprocessor 12. Reset control circuit 14 is an important feature of the inventive system and its function and mode of operation will be described hereinafter. As the voltage on the RESET terminal exceeds a level determined by the characteristic of the particular microprocessor, the processor executes a predetermined sequence of operation. A portion of the operating cycle involves known initialization of internal power-up routines and checks. The relevant sequence to the ignition of the main gas burner operation is as follows.

As terminal A7 assumes a high logic state, an activating signal is applied to the gate of thyristor 28 from a voltage divider comprised of series-connected resistors 84 and 86. Resistor 84 limits thyristor gate current, while resistor 86 maintains the thyristor gate at near ground potential to prevent unintentional firing of the thyristor device at high temperature. When the thyristor is in the conductive state, a spark is generated across spark gap terminal 40. Terminal A7 is adapted to pulse the gate of thyristor 28 during selected cycles of microprocessor operation to enable proper charging of capacitor 88. Capacitor 88 in DC power supply 36 is normally charged and is available, as needed, to generate the spark.

Substantially simultaneously with the activation of terminal A7, terminal A4 is energized through DC blocking capacitor 52 to the gate of thyristor 26 in pilot valve driver circuit 32 with the aid of a resistive voltage divider similar in design and function to that formed by resistors 84 and 86, as described above. Contacts K2 of relay 44 close when the thyristor is in the conductive state, activating the pilot gas valve and supplying gas to a pilot burner (not shown) disposed in operational proximity to spark gap 40. Terminal A4, in accordance with the invention, is adapted to pulse the gate of thyristor 26 in synchrony with the RESET terminal of microprocessor 12. Capacitor 48, connected in parallel with the coil winding of relay 44, is charged in operation and momentarily provides power to relay 44 when the thyristor is in the nonconductive state, as when the microprocessor is in the "rest" cycle of operation. In the direct ignition mode, substantially simultaneously with the activation of terminals A4 and A7, terminal A2 is activated and through main valve drive circuit 30 (which is similar to pilot valve drive circuit 32) relay contacts K1 act to open the main gas valve. Whether or not a pilot flame has been obtained is determined by a flame probe 90 disposed to sense the pilot flame, the pilot flame sensor circuit 22, and the C1 terminal of microprocessor 12. If after three attempts, for example, a pilot flame is not detected, the system shuts down and further efforts to initiate operation must be through operator intervention. The number of attempts may be selected as desired and the three attempts described herein are for illustrative purposes. As is the conventional practice, a purge interval is normally provided to exhaust any unburned gas between attempts, and the initial attempt to ignite the pilot flame. The duration of the purge interval is selected through timing select circuit 20.

If a flame is detected, terminal A7 is de-energized and terminal A2 energized to activate main valve drive circuit 32, which opens the main gas valve (not shown) by activating contacts K1 of relay 42. Construction and operation of main valve drive circuit 30 is substantially identical to that of pilot valve device circuit 32 described above. Thereafter the system operates in the "run" mode. Terminal A4 and the pilot flame remain on so that flame sensor circuit 22 continues to monitor the pilot flame. If the flame is lost, the main valve is closed by de-energizing relay 42, thereby opening K1 and K2 relay contacts. Operation thereafter is reinitiated as described above.

In the "run" mode, the operational state of the controller is monitored at terminals B1, B4 and B7 of the microprocessor, connected, respectively, to power line sense circuit 56, pilot valve sense circuit 58 and main valve sense circuit 60. The circuits 56, 58 and 60 are identical to one another in design and operational mode. By way of example, the power-line sense circuit consists of a pair of series-connected resistors connected between the B1 terminal and ground bus 66b. A filter capacitor 96 is connected between the common point of the resistors and bus 66b. The function of the power line sense circuit is to assure that the source of 24 voltage AC has not failed. The B4 terminal monitors whether the position of relay 44 in the pilot valve driven circuit 32 is in the appropriate position (opened, closed) for the particular point in the execution of the microprocessor preprogrammed sequence of operation. If, for example, at a particular instant, 24 volts AC is not detected on line 68 of the pilot valve output line, this would be an indication that thyristor 26 is in the nonconductive state. Accordingly, it would be necessary to verify whether terminal A4 must be activated.

Terminal B7 monitors the position of the main valve driver relay 41 in a manner similar to that described for terminal B4. Thus, for example, terminal B7 is monitored to determine whether 24 volts AC is present immediately after pilot valve driver circuit 32 activates the power to the pilot valve. The detection of 24 volts AC at this point in the sequence would indicate a failure of thyristor 24 in the conductive state. This would mean that the main valve is on in the absence of a pilot flame. Accordingly, it is necessary to turn off the pilot valve and the main valve to avoid escape of unburned gas. Since the voltage to the main valve is provided from the pilot valve, by a series-connected conductive shunt 98, shutoff of the main valve can be accomplished quickly and simultaneously.

The operation of microprocessor 12 to achieve the desired reliability described hereinabove will be described next. The operation of microprocessor 12 is conducted on a novel "synchronous reset" basis utilizing a novel linear program concept. "Synchronous reset" means a reset of the microprocessor which is repetitive and synchronous to a predetermined reference signal, such as the 60 Hz line frequency. The linear program concept involves a different approach than that in conventional applications of microprocessors. The software system is designed with a minimum of branching and no branch subroutines. This permits the prediction of potential microprocessor failure modes. The system of the invention relies on the software to check the data integrity on a line-cycle by line-cycle basis.

The structure of the software design is that the microprocessor first checks itself for data integrity and then performs the necessary operations and sets up the system for the next cycle by generating the necessary data for the next check cycle and then locks itself into wait condition which can only be stopped by the occurrence of a RESET signal.

In order to accomplish this type of linear programming, the system is table driven. A set of pointers to the data in the tables is maintained in the checked-data area. These table pointers are used to find the timing between the steps in the states of the furnace cycle. These steps include the purges, ignition and run modes. Each of the states are further broken down into substates which allow the system to do system integrity checks.

Reference is now made to FIG. 1 where the synchronous reset function is accomplished by reset control circuit 14 which is made up of a resistive voltage divider comprised of series-connected resistors 100, 102 and 104 connected between the 24 volt AC line and a ground bus 106. A first diode 108 is connected at its cathode terminal to the common point 110 between resistors 102 and 104 and at its anode to ground bus 106. A second diode 112 is connected at its anode to point 110 and the 5 volt DC output of power supply 16. A capacitor 114 connected in parallel with diode 108 provides filtering to the RESET input of terminal microprocessor 12 and a resistor 116 in series therewith limits the current thereto.

Figure 2A:
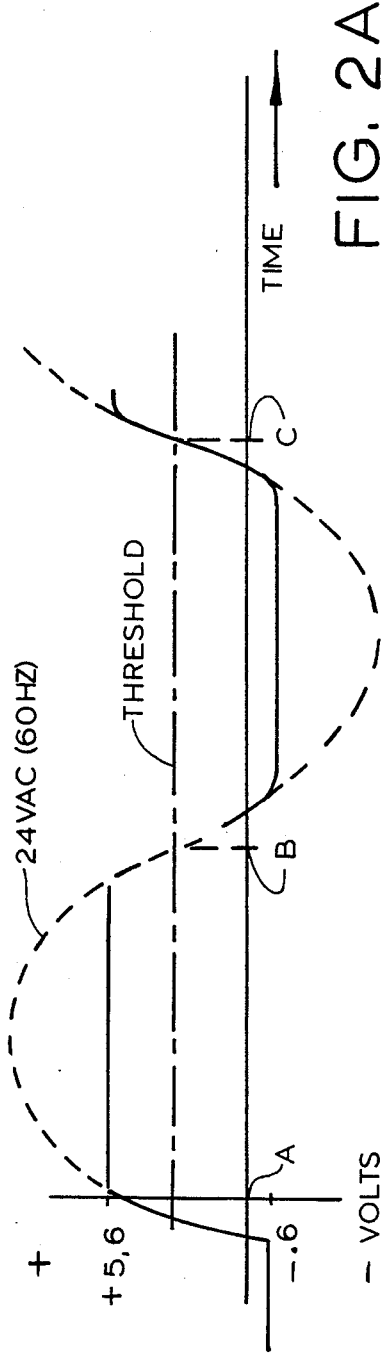
FIGS. 2A and 2B depict wave form diagrams useful in conjunction with FIG. 1 to gain an understanding of the operation of the present invention.

In operation, diodes 108 and 112 clamp the voltage to the RESET terminal between a negative 0.6 volts and 5.6 volts, respectively, and the voltage fluctuates therebetween in synchrony with the 60 Hz line frequency, as shown in FIG. 2A. In this manner, the microprocessor is reset 60 times each second to a known state as the voltage at the RESET terminal rises and falls below the reset threshold characteristic of the microprocessor device, typically equal to one-half the power supply voltage. In this embodiment, the threshold is approximately 2.5 volts. This also means that the software program can only be executed during those portions of the cycle, between Points A and B in FIG. 2A, when the microprocessor is in the active state. During the remaining time, the microprocessor rests in the inactive state, locked, as indicated above. The inactive state of the microprocessor is indicated between points B and C in FIG. 2A. In continuous operation, point C becomes point A of the next cycle of operation.

The advantage of such an approach over the prior art is that the speed at which the software program is executed is directly related to the frequency of the reset function. In the preferred embodiment, the reset frequency is selected to be 60 Hz. This means that 60 times each second the microprocessor is reset and executes a program starting at a known point prior to reverting to an inactive state until the next reset pulse. In this manner, any software errors due to the noise and the like propogate for a maximum time of 1/60th of a second and are corrected upon the reset during the next machine cycle. This is an important feature, since the 1/60th second interval is sufficiently short so that if an error has occurred, only small amounts of unburned gas escape before the error is corrected or the system is shut down.

The microprocessor-based ignition system is designed such that the program runs from reset to a stop condition during one half of a cycle of the 60 Hz line voltage. The system though powered by a DC supply has its reset input coupled to the 24 VAC line. The processor cannot run when the RESET terminal is less than about half of the DC supply, i.e., below the threshold level shown in FIG. 2A. When the voltage on the RESET terminal exceeds the threshold level the microprocessor starts to execute the resident program at a predetermined point which is read out from a fixed location ($1fff in the 6305 used in the preferred embodiment) in the memory map of the microprocessor. The program then continues to run until it stops itself with a WAIT or STOP command or the system is stopped by the hardware reset condition when the voltage on the RESET terminal is detected to be below the threshold level.

One difficulty encountered in the implementation of the system is that the processing time is limited to approximately less than 8.3 mSec. per cycle, so that the microprocessor must execute a known amount of the program during this time and that the system must be able to guarantee that the data in the microprocessor RAM is correct for the next cycle's operation upon the occurrence of the next RESET. This difficulty is due to apparent lack of difference between a traditional "power-on" RESET when the system starts up with no known state in the RAM and the synchronous reset in accordance with the invention which is necessary for the reliability of the circuit. The decision concerning the state of the machine must be based on the integrity of the data.

Figure 2B:
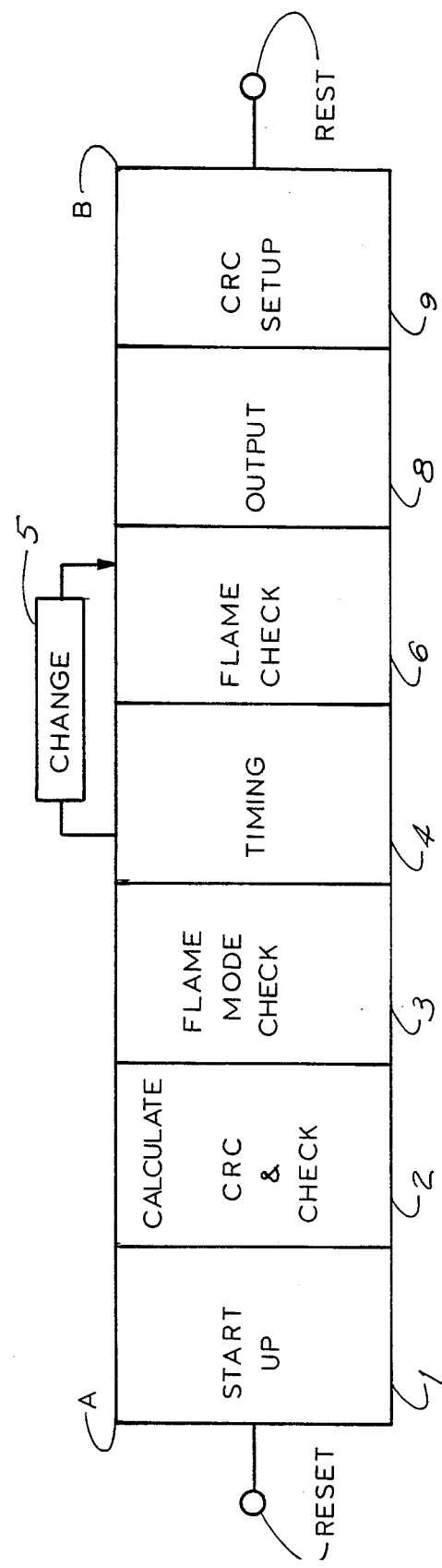
Figure 3:
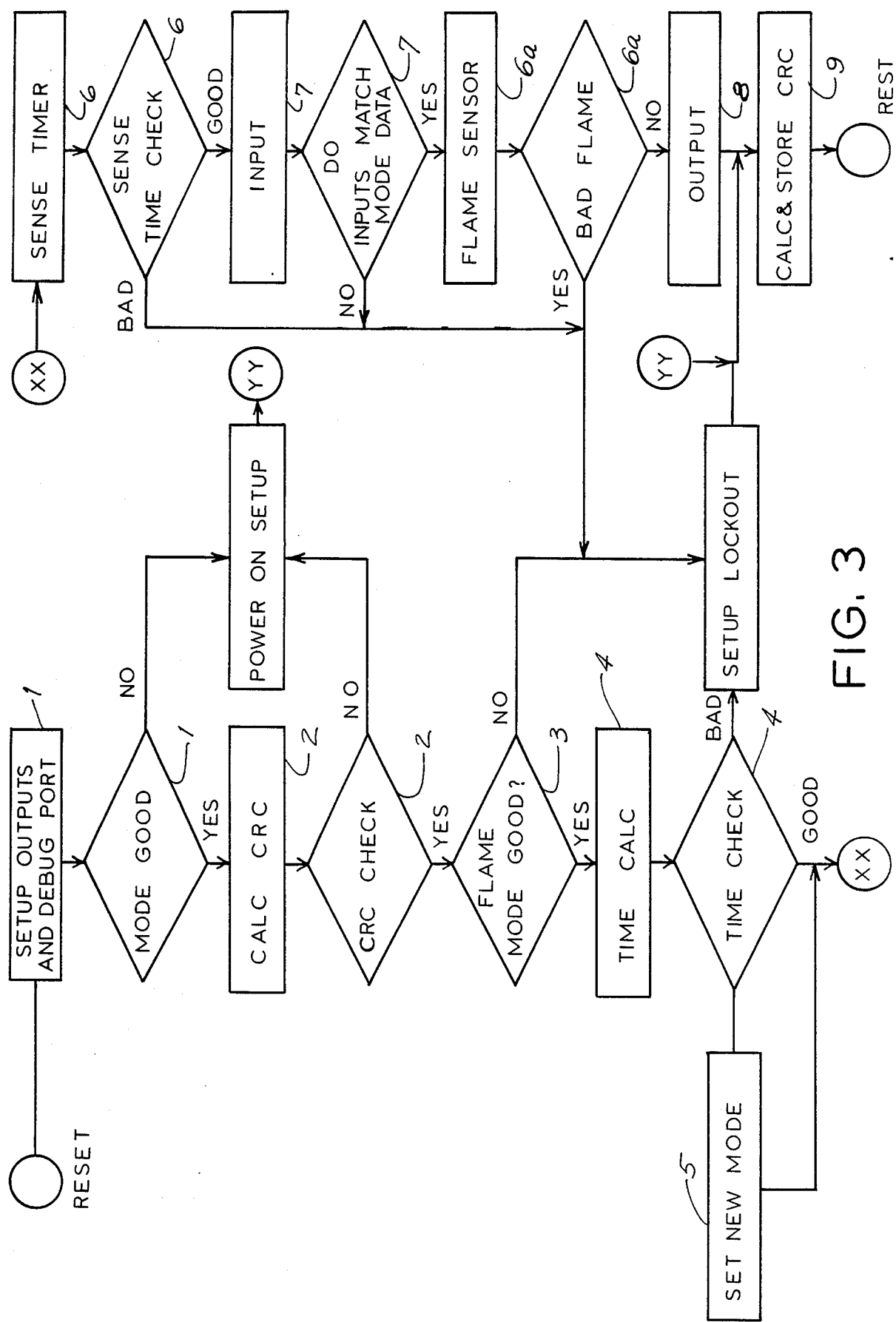
FIG. 3 depicts in flowchart format the sequence of operations executable during one machine cycle of the microprocessor-based controller of the present invention.

The manner in which the integrity of the data is checked, the linear nature of the executed program and the detailed operation of the inventive system through one active cycle of the microprocessor will be described hereinbelow with reference to FIGS. 2B and 3. FIG. 2B depicts the stages of microprocessor operation, while FIG. 3 depicts the corresponding sequence of steps in flow chart format, but with greater emphasis on the operational logic. Reference numerals 1-a in FIGS. 2B and 3 designate this correspondence. Reference letters "A" and "B" in FIGS. 2A and 2B designate the beginning and end, respectively, of the active microprocessor cycle. In FIG. 3, reference letters "XX" and "YY" designate common identical points of the flow chart for which connective lines have been omitted to preserve figure clarity.

FIGS. 2B and 3 clearly illustrate the linear sequence of the microprocessor program between RESET and REST. While there are jumps forward in the program logic, there are no subroutines or logic branches which double back. Thus, the only way to proceed is sequentially forward through the program to a REST state. The only way to enter the next cycle of operation (active state) is through the occurrence of a RESET. The frequency with which the RESET is cycled to occur depends on the process controlled and on how much error can be tolerated, recalling that errors do not propagate past a RESET.

Continuing now with reference to FIGS. 2B and 3, operation of the microprocessor begins with the occurrence of a RESET. This initiates the data integrity check.

The first of the set of data checks, as indicated at 1, is to look up the flag byte of the mode (i.e. purge, trial for ignition, run, lockout) of the state machine in a table. If the two do not match then the system is assumed to be coming out of a "power-on" state. The probability of this test not detecting that the system is preforming a power reset is low because the random access memory (RAM) of the microprocessor has a tendency to come up as all "0"s or all "1"s depending on the design of the chip. The likelihood of a random match occurring between a pair of mode or state flags is at best remote. This, however, is not an acceptable level of reliability in a safety circuit so an additional test is done.

The final data validity is checked using the well known Cyclical Redundancy Check (CRC), as shown at 2 in FIGS. 2A and 3, which is normally used in serial data transmission and in the data storage systems such as disks. The data which is generated by the CRC function is stored by the program at the end of one cycle and compared to the recalculated value at the beginning of the next cycle, as shown at a in FIGS. 2B and 3. If this newly calculated data does not match the previously stored value, then the system is assumed to be coming out of a "power-on" reset and not a synchronous reset.

The other means employed of proving data integrity, shown at 3 in FIGS. 2B and 3, is to permit the flags for noncounting data, such as the flame mismatch flag, to have only noncalculable states (i.e., other than a simple increment of a single bit) so that an erroneous calculation before storage (step 9) should not be able to store a valid state. This test is based on the probability of types of errors which are possible in a processor environment. It is, of course, possible for totally random occurrences to store data which cannot be detected as invalid. To further minimize the possibility of such improbable happenstance, the timers are all non-zero based. That is to say, the system allows only windows in which the counter values may be if the validity test is to be passed.

In addition to the overall data validity the safety timers and counters are stored both in the normal and complement states. That is to say that each time a timer or counter is changed the value of one is incremented and the other is decremented. The counters are loaded with complementary values so that the system can, after each change in the count, check that the values are equal. If at any time they are not equal the system goes to lockout, as indicated at 4 in FIGS. 2A and 3.

When the mode or the state is changed, step 5 FIGS. 2B and 3, by either the time counter reaching a predetermined value or the change of the state of an input (B1, B4, B7 in FIG. 1), the system performs a number of tests on the validity of the switch from one state to the other. (An example of a change of state may be the detection of a flame and the subsequent entry into the "run" mode). The system looks up the next desired state from a list. The new mode or state is then used to look up the flag byte value of the mode from the previous mode. If they match then the new flag byte of the mode of the state is stored and the times for the new state are loaded from two tables, a count up table and a count down table. These must be complements. The reason for using complements is that if a bit of the bus or ALU (arithmetic logic unit) are locked into one state then it is impossible for the system to pass the test.

The flame sensing circuit 22 (FIG. 1) is a synchronous detection scheme which is at least partially self checking. The program is designed to alternately discharge capacitor C7, wait a few cycles of operation then let it operate. This allows the system to detect that the circuit is not shorted to a DC source which would render the system unable to detect a flame, as required in 6 and 6a in FIGS. 2B and 3. If this occurs the system goes to lockout and can only be restarted by power interruption. The cyclic counter for the system is also a nonzero based complementary pair of bytes which must at all times match. The actual detection scheme is that after the circuit is shorted the voltage on the sensing capacitor must remain below the imput gate detection level at microprocessor imput C1 of about one half of the supply for at least a predefined number of cycles of the power line. After this system waits and rechecks input C1. If at this time the bit is high (logic level 1), then the system has detected a flame, as shown at 6a. Because of noise on the power lines and flickering while lighting a main burner, the system only considers the detection of a flame or a flameout if the error is detected twice in a row.

The control inputs B1, B4 and B7 are loaded and compared to the values which the system expects during the current machine state, as shown at 7 in FIGS. 2 and 3. If the inputs do not match then the system increments a counter which forces a change of speed of the microprocessor and the speeds of the relays. Four cycles of mismatch are needed to cause a state change.

The output and the loading of the output values to terminals A2, A4 and A7 based on the machine state are separated in time, and are not directly transferable, as shown at 8 in FIGS. 2B and 3. That is to say, the stored values must be run through a function and have the bits detected and other bits set to turn on the relays 42 and 44. The relays are AC coupled through capacitors 50 and 52 so that the shorting of an output even to the 24 VAC lines will not actuate the relay. Because of the power required by the gates of the SCR devices 24 and 26, only one can be pulsed at a time and a dead time is present to allow the recharging of the power supply capacitor 118 which is physically close to the processor.

At the conclusion of one cycle of operation the microprocessor calculates and stores the CRC, as shown at 9, and assumes an inactive state (REST) in anticipation of the next RESET signal.

The system is designed as a table driven state machine. This produces a set of linear processes which last for a fixed time if the inputs are consistent with the defined required states. If an error in the inputs exists, the system switches to a new linear set of states. That is, it set up a lockout, calculates and stores CRC values and enters the inactive state. This branching of the state machine allows the process to handle any exceptional input conditions.

The following is an example of the aforedescribed method of operation applied to a three try hot surface ignition system with "relay checking". The states of the machine are as follows:

| 0 | POWER ON | |
|---|---|---|
| 1 | PURGE | |
| 2 | HEAT | |
| 3 | RELAY 1 TEST | |
| 4 | IGNITER AND GAS | |
| 5 | FLAME ACQUISITION | |
| 6 | FLAME PROOF | |
| 7 | INTER TRIAL PURGE | LOOP TO HEAT |
| 8 | RUN | |
| 9 | LOCKOUT | |

This simplified algorithm is the basic one for the three relay system. It does not include any of the portions of the algorithm used to compensate for the relay pull-in or dropout times. The power-on condition is used to set up the machine to the desired state. The purge is a delay which allows the furnace to clear itself of unburned gases from the previous cycle. The heat allows the surface igniter to heat up to ignition temperatures. At the end of the heat time the redundant K1 and K2 relays are checked for operation. This is done by actuating the pilot relay 44 for one second prior to actuating main valve relay 42. Next the gas is turned on by actuating both relays K1 and K2 at the same time, while the hot surface ingiter is on. During this time the gas should light, but the flame may not be detectable, if the igniter is doubling as the flame sensor. During ignition the igniter is disconnected from the flame sensing circuit because of the high voltage applied to heat it to a temperature sufficient to ignite the gas. The igniter is switched from the powered state to the sensing state to allow the flame sensor to detect a flame. Its output is ignored at this time however, to allow the flame to become stable. During the flame acquisition period the system checks for the existence of the flame. If the flame is present the sequence switches to the run condition. Otherwise the system continues with the inter-purge time followed by the heat time as described above. The number of trials is counted and if the limit has been reached then the system goes to lockout instead of inter-purge.

If during any of the states of the algorithm the system detects an input condition which is not allowed then the system aborts to lockout. The system would remain in lockout until the power to the circuit is interrupted. Power interruption would restart the system at the beginning. If during the run condition the system detects that the flame has gone out, then it resets the retry counter to a predetermined count and starts an intertrial purge.

In order for the system to run an algorithm described hereinabove, a large set of tables (one for each state) must be generated. The existing system requires the time for each step in both the normal and complement, the next step in the sequence, the current flag byte for the mode, the previous flag byte, whether the flame is allowed, and the input mask and data output conditions (this allows the system to have don't care conditions).

If a different algorithm (i.e., direct, indirect or other process control algorithm) is desired the set of tables for the new function would need to be developed but the basic program itself would need little or no change. The only changes to the program would be those containing a specific reference to steps in the machine state. These would, for example, include references to generating a lockout purge, or adding a delay between the finding of a flame and turning the main gas on.

In the preferred embodiment, the time base for the system is the 60 Hz frequency of the power line. Because the timing is linked to the power lines the state variables would need to be changed to run on a 50 Hz system to achieve the same speed, otherwise execution of the program would take 20% longer. The high frequency for the processor is independent of function as long as the system can finish the whole program to the wait (REST) state during the time that the reset line is held high. Minor changes to the program might be needed if the processor clock speed is increased to a point where the gate pulses to the SCRs are too far ahead of the peak voltage of the line power. The condition of leading the phase of the power too far will cause the SCRs to be unable to latch because of lack of current. Under these circumstances the capacitors across the relays are charged on alternate cycles of the power.

While this invention has been described with reference to particular embodiments and examples, other modifications and variations will occur to those skilled in the art in view of the above teachings. Accordingly, it should be understood that within the scope of the appended claims the invention may be practiced otherwise than as specifically described.

We claim:

1. Apparatus for reliably controlling a process, comprising:
   a microprocessor having input means for receiving an electrical input signal conveying information about said process and output means for providing an electrical output signal for controlling at least one parameter related to said process; and
   means for applying an activating signal, obtained from a source independent of said process, to a reset terminal of said microprocessor means, said activating signal having succeeding, repetitive first and second levels whereupon in operation said microprocessor enters an active state when said activating signal is at the first level and an inactive state when said activating signal is at the second level;
   wherein said microprocessor is configured to execute succeeding portions of a linear program in synchrony with succeeding first levels of said activating signal, and to receive said electrical input signal and provide said electrical output signal to thereby control said process.

2. The apparatus of claim 1 wherein said microprocessor comprises means for controlling the operation of a combustible fuel furnace.

3. The apparatus of claim 1 wherein said microprocessor comprises means for performing data integrity checks upon entering the active state to insure reliability and means for calculating and storing information prior to entering the inactive state, said last mentioned stored information useful for performing data integrity checks in subsequent active states.

4. The apparatus of claim 1 wherein said means for applying comprises means for applying a uniformly periodic signal.

5. The apparatus of claim 4 wherein said uniformly periodic signal comprises an alternating current signal used to energize said microprocessor.

6. The apparatus of claim 1 wherein said microprocessor comprises means for verifying operational states of the linear program based on said input electrical signals with predetermined states stored in a memory of said microprocessor and means for aborting execution of said linear program if a disparity is detected.

7. An apparatus for controlling a process having a plurality of parameters associated therewith, comprising:
   processing means for executing a program, which program includes a predetermined sequence of operations, said processing means including:
   input means for receiving an electrical signal indicative of a first parameter associated with said process;
   output means for providing an electrical output signal which controls a second parameter associated with said process; and
   a reset terminal disposed to receive an externally applied periodic signal having regularly spaced, alternating first and second levels; and
   activating means for applying said periodic signal to said rest terminal of said processing means;
   said processing means being configured to enter an active state during application of said first level of said periodic signal and an inactive state during application of said second level of said periodic signal, said processing means being further configured to execute a predetermined portion of said program while said processing means is in said active state.

8. The apparatus of claim 7, wherein said predetermined portion of said program comprises the entirety thereof, such that said processing means executes said program once during each of said active states.

9. The apparatus of claim 7, wherein said processing means is configured to execute said program during an interval, the duration of which is less than the duration of said active state.

10. The apparatus of claim 7 wherein said processing means enters said inactive state once per period of said periodic signal.

11. The apparatus of claim 7, wherein:
    said first parameter comprises a pilot flame;
    said second parameter comprises a pilot valve configured to assume one of at least two positions in accordance with said program;
    said input means comprises a pilot flame sensor circuit configured to detect said pilot flame; and
    said output means comprises a pilot valve driver circuit.

12. The apparatus of claim 11, further comprising:
    a main gas valve;
    a main gas valve driver circuit configured to control the position of said main gas valve;
    a spark gap;
    a spark generator circuit configured to selectively generate a spark at said spark gap; and
    said process comprises the operation of a combustible fuel furnace;
    wherein said processing means is configured to control the operation of said main gas valve driver circuit, said pilot valve driver circuit, and said spark gap generator circuit in accordance with said program.

13. The apparatus of claim 12, further comprising a thermostat;

wherein, in accordance with said program and in response to a request for heat from said thermostat, said pilot valve driver circuit provides said electrical output signal to thereby open said pilot valve and said spark generator circuit generates a spark at said spark gap in accordance with said program.

14. The apparatus of claim 12, wherein said processing means is configured to selectively close said pilot valve and said main gas valve, in accordance with said program, when said pilot flame sensor circuit does not detect said pilot flame.

15. The apparatus of claim 12, wherein said one of at least two positions comprises an open position, and wherein said spark gap is disposed adjacent said pilot valve such that, when said spark generator circuit generates said spark and said pilot valve is in said open position, said pilot flame is produced in accordance with said program.

16. The apparatus of claim 12, wherein;

said main gas valve is disposed adjacent said pilot valve; and said processing means is configured to maintain said main gas valve in an open position when said flame sensor circuit detects said pilot flame, and said processing means is configured to maintain said main gas valve in a closed position when said flame sensor circuit does not detect said pilot flame, in accordance with said program.

* * * * *